(12) United States Patent  
Selvidge et al.

(10) Patent No.: US 11,113,441 B1
(45) Date of Patent: Sep. 7, 2021

(54) REDUCE/BROADCAST COMPUTATION-ENABLED SWITCHING ELEMENTS IN AN EMULATION NETWORK

(71) Applicant: Mentor Graphics Corporation, Wilsonville, OR (US)

(72) Inventors: Charles W Selvidge, Oakland, CA (US); Jean-Marc Brault, Guyancourt (FR); Jean-Paul Clavequin, Sevres (FR); Laurent Vuillemin, Montigny le Bretonneux (FR)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/911,805

(22) Filed: Jun. 25, 2020

(51) Int. Cl.
*G06F 30/34* (2020.01)
*H04B 1/40* (2015.01)
*G06F 30/343* (2020.01)
*G06F 30/347* (2020.01)
*G06F 119/10* (2020.01)
*G06F 119/02* (2020.01)

(52) U.S. Cl.
CPC .......... *G06F 30/343* (2020.01); *G06F 30/347* (2020.01); *H04B 1/40* (2013.01); *G06F 2119/02* (2020.01); *G06F 2119/10* (2020.01)

(58) Field of Classification Search
CPC .................. G06F 30/34; H04B 1/40

USPC ......... 716/100, 101, 106, 116, 117
See application file for complete search history.

(56) References Cited

U.S. PATENT DOCUMENTS

| | | | |
|---|---|---|---|
| 10,410,713 B1* | 9/2019 | Selvidge et al. | G06F 30/331 |
| 10,521,544 B2* | 12/2019 | Suresh et al. | G06F 30/34 |
| 10,546,081 B2* | 1/2020 | Mohamed et al. | G11C 29/54 |
| 10,628,548 B2* | 4/2020 | Krishnamurthy et al. | G06F 11/221 |
| 10,664,563 B2* | 5/2020 | Bhattacharya et al. | G06F 30/331 |
| 10,678,976 B2* | 6/2020 | Ali et al. | G06F 40/143 |

* cited by examiner

*Primary Examiner* — Sun J Lin (57) ABSTRACT

Each reconfigurable hardware modeling circuit of a plurality of reconfigurable hardware modeling circuits in a reconfigurable hardware modeling device comprises: a model computation subsystem configurable either to model elements of a circuit design, or to serve as a testbench element, or both, and a network subsystem comprising: network circuitry and signal reduction circuitry, the signal reduction circuitry configurable to perform a signal reduction function, the signal reduction function combining a plurality of status signals into a single status signal, the plurality of status signals comprising status signals received from one or more reconfigurable hardware modeling circuits in the plurality of reconfigurable hardware modeling circuits. Alternatively or additionally, each network circuit of a plurality of network circuits in the reconfigurable hardware modeling device may comprise signal reduction circuitry configurable to perform the signal reduction function.

24 Claims, 8 Drawing Sheets

REDUCE/BROADCAST COMPUTATION-ENABLED SWITCHING ELEMENTS IN AN EMULATION NETWORK

FIELD OF THE DISCLOSED TECHNOLOGY

The present disclosed technology relates to the field of circuit design verification. Various implementations of the disclosed technology may be particularly useful for networking in an emulator.

BACKGROUND OF THE DISCLOSED TECHNOLOGY

Electronic circuits, such as integrated circuits, are used in a variety of products, from automobiles to smart phones to personal computers. Designing and fabricating these circuit devices typically involves many steps, known as a "design flow." The particular steps of a design flow often are dependent upon the type of integrated circuit being designed, its complexity, the design team, and the integrated circuit fabricator or foundry that will manufacture the circuit. Typically, software and hardware "tools" will verify a design at various stages of the design flow by running software simulators and/or hardware emulators/prototyping devices. The verification processes then are used to identify and correct errors in the design.

Several steps are common to most design flows. Typically, the specification for the new circuit initially is described at a very abstract level as a logical design. An example of this type of abstract description is a register transfer level (RTL) description of the circuit. With this type of description, the circuit is defined in terms of both the exchange of signals between hardware registers and the logical operations that are performed on those signals. A register transfer level design typically employs a Hardware Description Language (HDL) (sometimes also referred to as hardware design language or hardware definition language), such as the Very high speed integrated circuit Hardware Description Language (VHDL) or the Verilog language. The logic of the circuit is then analyzed, to confirm that the logic incorporated into the design will accurately perform the functions desired for the circuit. This analysis is sometimes referred to as "functional verification."

Logic simulation is a tool used for functional verification. Designing hardware today involves writing a program in the hardware description language. A simulation may be performed by running that program on a computer. Such an electronic design simulator can determine what the various states of an electronic design would be when presented with some input stimulus. Simulators are commercially available such as the QUESTA family of simulators from Mentor Graphics Corporations of Wilsonville, Oreg.

Software-based simulation, however, may be too slow for large complex designs such as SoC (System-on-Chip) designs. The speed of execution of a simulator drops significantly as the design size increases due to cache misses and memory swapping. Emulation and prototyping significantly increase verification productivity by employing reconfigurable hardware modeling devices including emulators and prototyping devices. Field programmable gate arrays (FPGAs)-based emulators and prototyping devices rely on an actual silicon implementation and perform circuit verification generally in parallel as the circuit design will execute in a real device. By contrast, a simulator performs circuit verification by executing the hardware description code serially. The different styles of execution can lead to orders of magnitude differences in execution time. Examples of hardware emulators include the VELOCE family of emulators available from Mentor Graphics Corporation of Wilsonville, Oreg., the ZEBU family of emulators available from Synopsys, Inc. of Mountain View, Calif., and the PALLADIUM family of emulators available from Cadence Design Systems of San Jose, Calif.

A reconfigurable hardware modeling device is typically constructed by connecting a large number of homogenous or heterogeneous reconfigurable hardware modeling circuits. Each of these reconfigurable hardware modeling circuits can be programmed to model some elements of an integrated circuit design, some elements of a testbench, or both. The testbench is used to create or apply stimuli to the modeled design in a verification process and to capture and evaluate responses from the modeled design to assess whether the design is behaving according to expectations.

The modeled design often has multiple external interfaces where each interface operates independently, giving rise to a testbench structure with a large number of distinct components operating in a loosely coupled fashion. Testbench elements within the emulator may interact with software such that software does some part of the processing of stimuli or response data via a communication channel. In such cases, individual testbench elements may not respond in a systematic or predictable amount of time due to variability in the duration of software processing or communication.

To achieve coherent and repeatable behavior of the modeled design, it is useful to apply a limited amount of global control over otherwise independent testbench elements. Testbench elements can be configured to know if they are ready or if they are awaiting some interaction with software. The execution of the modeled design can be allowed to proceed when all testbench elements are ready and can be stalled or stopped globally across the system if any of them are not ready. This helps achieve the repeatability objective.

BRIEF SUMMARY OF THE DISCLOSED TECHNOLOGY

Various aspects of the present disclosed technology relate to techniques for enabling reducing/broadcasting computation in network elements in a reconfigurable hardware modeling circuit network. In one aspect, there is a reconfigurable hardware modeling device comprising: a plurality of reconfigurable hardware modeling circuits, each of the plurality of reconfigurable hardware modeling circuits comprising: a model computation subsystem configurable to model elements of a circuit design, to serve as a testbench element, or both, and a network subsystem comprising: network circuitry and signal reduction circuitry, the network circuitry comprising circuitry configurable to perform a signal broadcast function, the signal reduction circuitry configurable to perform a signal reduction function, the signal reduction function being a function of combining a plurality of status signals into a single status signal, the plurality of status signals comprising status signals received from one or more reconfigurable hardware modeling circuits in the plurality of reconfigurable hardware modeling circuits, the signal broadcast function being a function of transmitting the single status signal to one or more other circuits in the reconfigurable hardware modeling device.

The plurality of status signals may further comprise a status signal generated by the model computation subsystem, status signals received from one or more network switching circuits in the reconfigurable hardware modeling device, or both.

The one or more other circuits in the reconfigurable hardware modeling device may comprise reconfigurable hardware modeling circuits in the plurality of reconfigurable hardware modeling circuits, network circuits, or both.

The reconfigurable hardware modeling device may further comprise: a plurality of network circuits configurable to assist communications between the plurality of reconfigurable hardware modeling circuits, each of the plurality of network circuits comprising: another network circuitry and another signal reduction circuitry, the another signal reduction circuitry configurable to combine another plurality of status signals comprising status signals received from one or more reconfigurable hardware modeling circuits in the plurality of reconfigurable hardware modeling circuits into another single status signal, the another network circuitry comprising circuitry configurable to transmit the another single status signal to one or more other circuits in the reconfigurable hardware modeling device. The each of the plurality of network circuits may further comprise storage circuitry configured to store an output of the another signal reduction circuitry, and the another plurality of status signals may further comprise a signal outputted from the storage circuitry. The another signal reduction circuitry may perform a logical AND function or a logical OR function.

The network subsystem may further comprise storage circuitry configured to store the single status signal, and the plurality of status signals may further comprise a signal output from the storage circuitry.

The plurality of status signals and the single status signal may be one-bit signals. The signal reduction function may be a logical AND function or a logical OR function.

The reconfigurable hardware modeling device may be a processor-based emulator, and the plurality of reconfigurable hardware modeling circuits may be Boolean processor circuits.

The reconfigurable hardware modeling device may be an FPGA-based emulator, and the plurality of reconfigurable hardware modeling circuits may be commercial FPGA chips or custom-designed FPGA chips.

The signal reduction circuitry may be configurable to compute reduced status signals for multiple reducing/broadcasting networks.

In another aspect, there is a reconfigurable hardware modeling device comprising: a plurality of reconfigurable hardware modeling circuits; and a plurality of network circuits configurable to assist communications between the plurality of reconfigurable hardware modeling circuits, each of the plurality of network circuits comprising: network circuitry and signal reduction circuitry, the network circuitry comprising circuitry configurable to perform a signal broadcast function, the signal reduction circuitry configurable to perform a signal reduction function, the signal reduction function being a function of combining a plurality of status signals into a single status signal, the plurality of status signals comprising status signals received from one or more reconfigurable hardware modeling circuits in the plurality of reconfigurable hardware modeling circuits, the signal broadcast function being a function of transmitting the single status signal to one or more other circuits in the reconfigurable hardware modeling device.

Each of the plurality of reconfigurable hardware modeling circuits may comprise: a model computation subsystem configurable to model elements of a circuit design, to serve as a testbench element, or both, and a network subsystem comprising: another network circuitry and another signal reduction circuitry, the another signal reduction circuitry configurable to combine another plurality of status signals comprising status signals received from one or more reconfigurable hardware modeling circuits in the plurality of reconfigurable hardware modeling circuits into another single status signal. The network subsystem may further comprise storage circuitry configured to store the another single status signal, and the another plurality of status signals may further comprise a signal output from the storage circuitry. The another plurality of status signals may further comprise a status signal generated by the model computation subsystem.

The each of the plurality of network circuits may further comprise storage circuitry configured to store the single status signal, and the plurality of status signals may further comprise a signal outputted from the storage circuitry.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Various aspects of the present disclosed technology relate to techniques for enabling reducing/broadcasting computation in network elements in a reconfigurable hardware modeling circuit network. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform", "combine" and "reduce" to describe the disclosed methods/systems. Such terms are high-level descriptions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Hardware Modeling Environment

Reconfigurable hardware modeling devices can be emulators or prototyping devices. Two types of emulators have been developed. The first type is FPGA-based. In an FPGA-based architecture, each FPGA chip (reconfigurable hardware modeling circuit) has a network of prewired blocks of look-up tables and coupled flip-flops. A look-up table can be programmed to be a Boolean function, and each of the look-up tables can be programmed to connect or bypass the associated flip-flop(s). Look-up tables with connected flip-flops act as finite-state machines, while look-up tables with bypassed flip-flops operate as combinational logic. The look-up tables can be programmed to mimic any combinational logic of a predetermined number of inputs and outputs. To emulate a circuit design, the circuit design is first compiled and mapped to an array of interconnected FPGA chips. The compiler usually needs to partition the circuit design into pieces (sub-circuits) such that each fits into an FPGA chip. The sub-circuits are then synthesized into the look-up tables (that is, generating the contents in the look-up tables such that the look-up tables together produce the function of the sub-circuits). Subsequently, place and route are performed on the FPGA chips in a way that preserves the connectivity in the original circuit design.

The programmable logic chips (reconfigurable hardware modeling circuits) employed by an emulator may be commercial FPGA chips or custom-designed emulation chips containing programmable logic blocks. A custom FPGA-based emulator can have a specially designed internal interconnection network of programmable elements within each custom FPGA, an external interconnecting network and I/O structure of custom FPGAs, and a design-under-test debug engine. Such architecture enables, compared to a commercial FPGA-based counterpart, fast and correct-by-construction compilation and high design visibility in the silicon fabric that can assume 100% access without probe compilation and rapid waveform tracing. A commercial FPGA chip may have somewhat larger capacity density than a custom FPGA chip. For a given design, a custom FPGA-based emulator may need more FPGAs than a commercial FPGA-based emulator, leading to larger physical dimensions and higher power consumption.

The second type of emulators is processor-based: an array of Boolean processors (reconfigurable hardware modeling circuits) able to share data with one another is employed to map a circuit design, and Boolean operations are scheduled and performed accordingly. Similar to the FPGA-based, the circuit design needs to be partitioned into sub-circuits first so that the code for each sub-circuit fits the instruction memory of a processor. The compilation speed of a processor-based emulator, however, is much faster than those of a FPGA-based emulator. Drawbacks are limited speed of execution in a transaction-based mode, large power consumption, and large physical dimensions compared to a FPGA-based emulator.

An emulator may operate in various modes. In an in-circuit emulation mode, the emulator is connected with a user's target system to form a prototype of the system the user is designing. The emulator typically replaces the circuit being designed for the target system, allowing system-level and software testing prior to silicon availability. Although an emulator may run up to six orders of magnitude faster than a simulator, it is often not fast enough to run at the same speed of the physical target system (a few megahertz vs hundreds of megahertz). Speed rate adapters may be introduced between the target system and the emulator. A rate adapter behaves like a buffer. It caches the signal activity from the design-under-test (DUT) at emulation speed and sends it at real-time speed to the target system. Conversely, it captures the signal activity from the target system at full speed, caches it, and then sends it back to the DUT at emulation speed. Even when a rate adapter is available, the constant evolution of speed and complexity of individual I/O protocols may make timely rate adapter development difficult.

In an acceleration mode, the physical target system is replaced by a virtual target system modelled via one of the high-level languages such as SystemVerilog, SystemC, or C++. The acceleration mode leverages the existing simulation testbench and removes the need for external rate adapters. The testbench creates test vectors and check corresponding responses of the circuit model. In addition to the elimination of speed adapters, the acceleration mode has advantages such as no hardware dependencies, the ability to use the emulator remotely, and the ability to run verification of corner cases.

The acceleration mode can be cycle-based or transaction-based. The cycle-based acceleration mode employs a signal-level or bit-level interface connecting the testbench processed by the host workstation to the design mode on the emulator. Each and every transition on each and every interface signal must be transferred between the testbench and the design model at the slow speed of the testbench simulated in the workstation. As a result, the speed of the emulator is wasted waiting to carry out these signal transfers.

The transaction-based acceleration reduces the traffic between workstation and emulator by replacing bit-by-bit exchanges with transaction exchanges. Data exchange is through so-called transactors. A transactor, including a front-end proxy interface on the workstation or host computer, a back-end bus-functional model on the emulator and a physical communication channel between the host computer and the emulator, converts high-level commands from the testbench on the host computer into signal-level bit sequences required by the design-under-test model on the emulator, and vice versa. This allows data being streamed and buffered between the testbench on the host computer and the design-under-test on the emulator, speeding up the execution of the testbench on the host computer. A design team can thus access the full performance of the emulator. In addition to performance, the transaction-based emulation eliminates the need for rate adapters. The design-under-test can connect to a "virtual device" (a software model of the device) that runs on the host computer through a transaction-level interface or to a physical device through a transaction-level interface and a "virtual device" acting as a bridging device.

In addition to emulators, reconfigurable hardware modeling devices also include FPGA prototyping devices. FPGA prototyping is typically deployed near the end of the verification process to catch system-level issues. For designs that rely heavily on commercial intellectual property (IP), an FPGA-based prototype is an ideal test platform for ensuring all IP components perform together. An FPGA-based prototype can also serve as a vehicle for software development and validation. Embedded software has become the dominant part of the effort in modern System-on-Chip (SoC) design. FPGA prototyping provides software developers early access to a fully functioning hardware platform well before real silicon. This enables early software development tasks such as operating system (OS) integration and application testing. The increased productivity of software development and validation greatly accelerates a product's time-to-market.

Compared to FPGA-based emulators which typically operate at one to two million cycles per second, FPGA prototypes are designed and built to achieve the highest speed of execution possible, allowing the extension of the speed range into tens of megahertz. The downside to FPGA prototyping is capacity limitations, limited debugging capabilities and long bring-up time. With growing complexity of FPGAs and advancement in both emulation and prototyping technologies, the lines between FPGA-based prototyping and emulation are increasingly blurring.

Figure 1A:
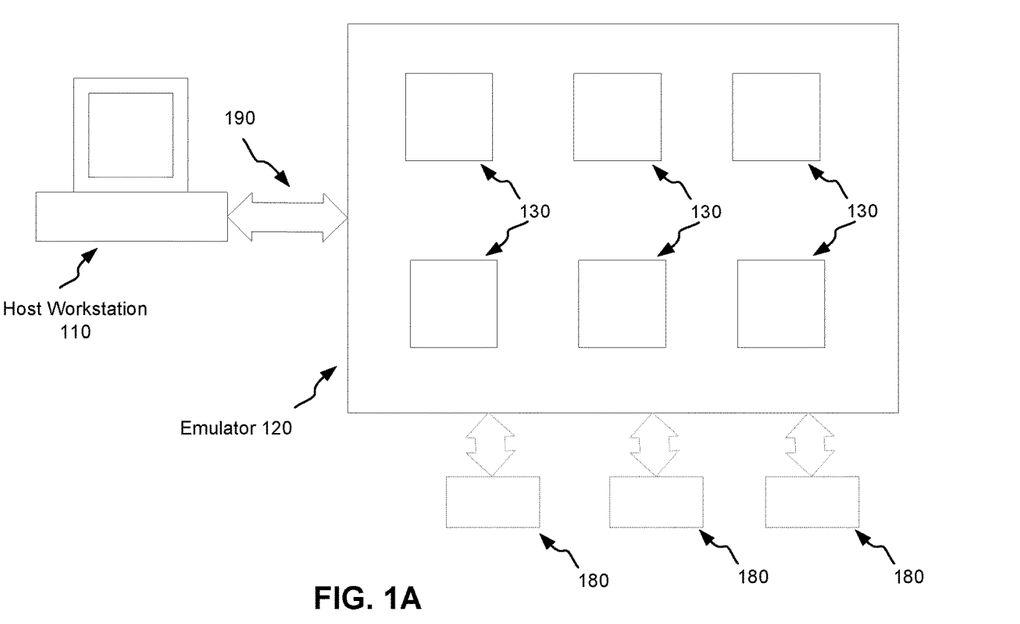
FIG. 1A shows an illustrative example of an emulation system with an emulator being coupled to targets.

In some embodiments, the disclosed technology may be implemented as part of a hardware emulation environment, such as the one illustrated in FIG. 1A. As seen in this figure, the hardware emulation environment includes an emulator 120 coupled to a host computer or workstation 110. The workstation 110 may be implemented by one or more computing systems. One computing system may include a single computer or multiple computers (e.g., a master computer and a plurality of slave computers). The workstation provides the capability to load the DUV (design-under-verification, also referred to as DUT—design under test) model into the emulator, controls the execution of the DUV model on the emulator over time, and serves as a debugging interface into the DUV model on the emulator. As discussed previously, the workstation may include the testbench and perhaps other software models in some of the operational modes.

The emulator 120 includes multiple printed circuit boards (emulation circuit boards) 130. These emulation circuit boards 130 are networked (not shown). A circuit design may be partitioned by the workstation 110 and loaded to the emulation circuit boards 130 for emulation often along with testbench elements.

In the in-circuit emulation mode, one or more targets 180 may be coupled to the emulator 120 as shown in FIG. 1A. In some simple environments, a target may be a piece of test equipment that generates and verifies test data such as a network tester. In other environments, the target can be the actual circuitry with which the DUT model will interact in its final application (e.g., other hardware components of the system for which the DUT model is designed). A target can be either a static target or a dynamic target, depending on whether design clock signals run in the emulator can be suspended or not.

Figure 1B:
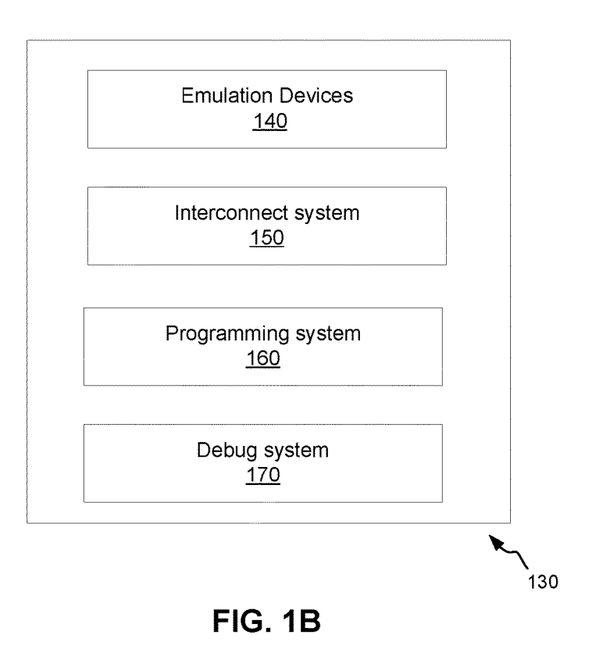
FIG. 1B shows an illustrative example of an emulation circuit board.

FIG. 1B illustrates an example of an emulation circuit board 130. The emulation circuit board 130 includes an array of emulation devices 140 (reconfigurable hardware modeling circuits). The emulation devices 140 can be programmed to model, for example, combinatorial logic elements, sequential circuit elements and memories. The emulation devices 140 may be processor-based or FPGA-based.

Also included in the emulation circuit board 130 are a configurable interconnect system 150, a programming system 160, and a debug system 170. A portion of a circuit design on one emulation device may need data computed by another portion of the design on another emulation device. The configurable interconnect system 150 allows data to be moved between emulation devices 140. In some implementations, the configurable interconnect system 150 may include a cross-bar device, a multiplexer, some other configurable network, or any combination thereof.

The programming system 160 enables a variety of other types of data to be brought in or out from an emulation device 140. Examples include programming data to configure an emulation device to perform a particular function, visibility data collected from the debug system 170 to be brought to the host workstation 110 for display, and content data either read from or written to memory circuitry in an emulation device 140.

The debug system 170 enables the emulation system to monitor the behavior of a modeled circuit design. Needed data for visibility viewing purposes can be stored in the debug system 170. The debug system 170 may also provide resources for detecting specific conditions occurring in the circuit design. Such condition detection is sometimes referred to as triggering.

The emulator 120 is coupled to the host workstation 110 through an interface system 190. The interface system 190 comprises one or more interfaces. A typical interface is optimized to transport large amounts of data such as data containing the emulated circuit design model (e.g., FPGA configuration bitstreams), initial contents of registers and design memories and data for debugging purposes. This interface is independent of design-under-test and may comprise dedicated logic or programmed logic in the emulator.

The interface system may also comprise one or more transaction-level interfaces. These interfaces may be optimized for small packets of data and fast streaming speed. The speed may be, for example, in the order of 2-3 Gigabits per second. The communication is performed through transactors as discussed previously. A transactor includes a backend bus-functional model—instrumented logic in the emulator model, which requires the emulator infrastructure clock keep running even though the design clocks can be stopped.

It should also be appreciated that the emulation system in FIG. 1A and the emulation circuit board 130 in FIG. 1B are illustrated as examples only, and they are not intended to be limiting. Various embodiments of the disclosed technology may be implemented using only a subset of the components illustrated in the figures, or include an alternate combination of components, including components that are not shown in the figures.

Illustrative Computer-Based Operating Environment

Figure 2:
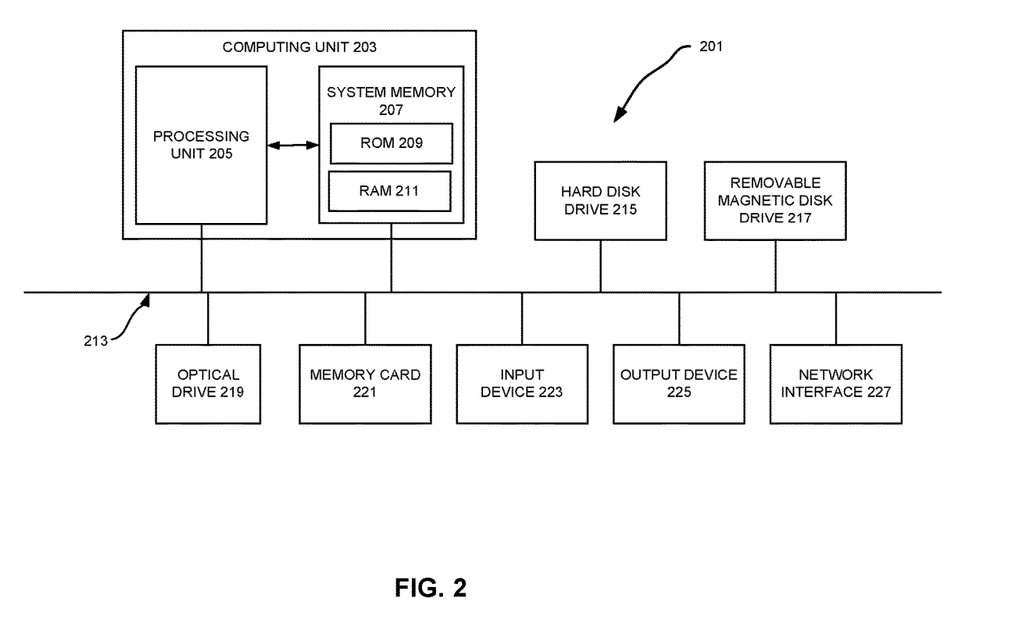
FIG. 2 illustrates a programmable computer system which various embodiments of the disclosed technology may employ.

FIG. 2 shows an illustrative example of a computing device 201 which may serve as the workstation 110 and/or implement various embodiments of a part or whole of the disclosed technology. As seen in this figure, the computing device 201 includes a computing unit 203 with a processing unit 205 and a system memory 207. The processing unit 205 may be any type of programmable electronic device for executing software instructions, but will conventionally be a microprocessor. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure, to one or more peripheral devices. For example, the processing unit 205 or the system memory 207 may be directly or indirectly connected to one or more additional memory storage devices, such as a "hard" magnetic disk drive 215, a removable magnetic disk drive 217, an optical disk drive 219, or a flash memory card 221. The processing unit 205 and the system memory 207 also may be directly or indirectly connected to one or more input devices 223 and one or more output devices 225. The input devices 223 may include, for example, a keyboard, a pointing device (such as a mouse, touchpad, stylus, trackball, or joystick), a scanner, a camera, and a microphone. The output devices 225 may include, for example, a monitor display, a printer and speakers. With various examples of the computer 201, one or more of the peripheral devices 215-225 may be internally housed with the computing unit 203. Alternately, one or more of the peripheral devices 215-225 may be external to the housing for the computing unit 203 and connected to the bus 213 through, for example, a Universal Serial Bus (USB) connection.

With some implementations, the computing unit 203 may be directly or indirectly connected to one or more network interfaces 227 for communicating with other devices making up a network. The network interface 227 translates data and control signals from the computing unit 203 into network messages according to one or more communication protocols, such as the transmission control protocol (TCP) and the Internet protocol (IP). Also, the interface 227 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 201 is illustrated as an example only, and is not intended to be limiting. Various embodiments of the disclosed technology may be implemented using one or more computing devices that include the components of the computer 201 illustrated in FIG. 2, which include only a subset of the components illustrated in FIG. 2, or which include an alternate combination of components, including components that are not shown in FIG. 2. For example, various embodiments of the disclosed technology may be implemented using a multiprocessor computer, a plurality of single and/or multiprocessor computers arranged into a network, or some combination of both.

Reducing/Broadcasting Computations

As discussed previously, limiting circuit model execution to occur only when all testbench elements are ready can help to achieve the repeatability objective. One way to implement this form of control is to have each testbench element generate a signal indicating its status. The values of all these status signals can then be combined to represent the global status. Assume that each testbench element produces a status signal with a value of 1 when it is ready and that a global status signal is produced by performing an AND operation on all these signals. If all testbench components are ready, then the global status signal will have a value of 1, indicating that the emulation computation can proceed. On the other hand, the global status signal having a value of 0 will prevent the emulation computation from proceeding. The generation of the global signal is thus referred to as a reduction operation. Such a global signal may need to be sent to most or all of the computing devices in order to have them respond appropriately. This transmission of the global signal is referred to as a broadcast operation.

Figure 3A:
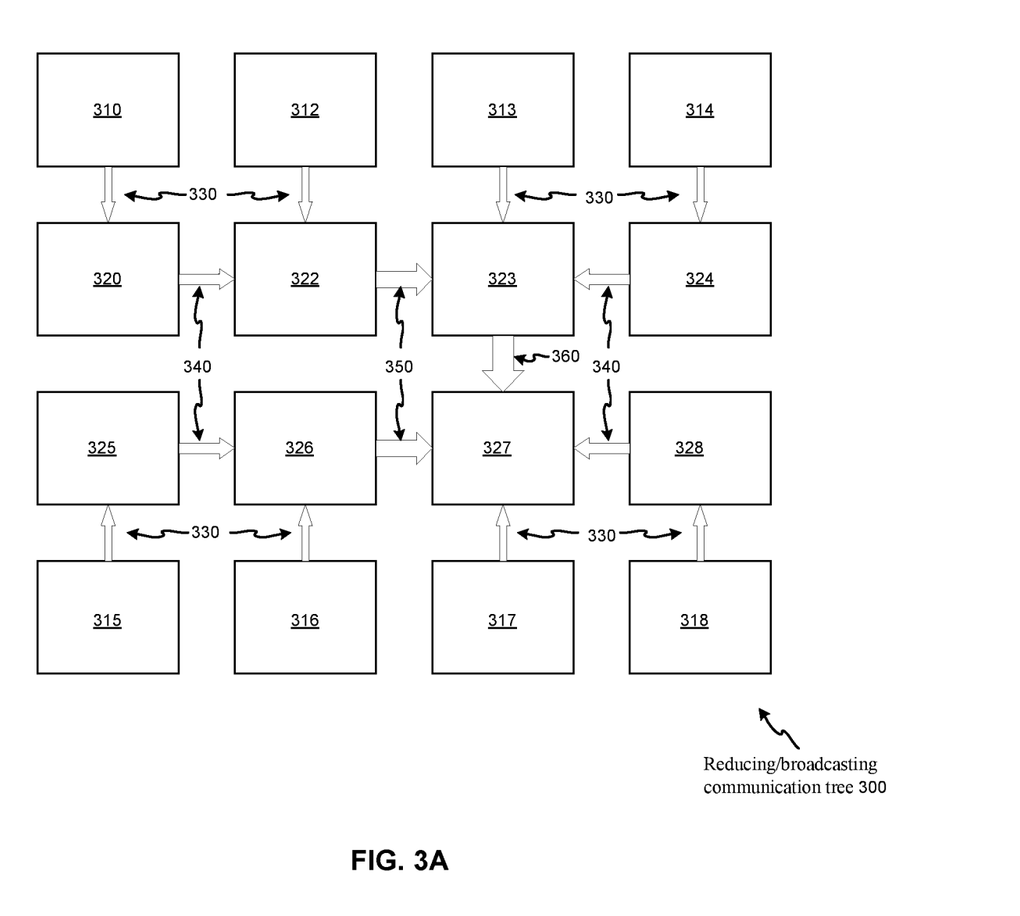
FIG. 3A illustrates an example of a reducing/broadcasting communication tree for reconfigurable hardware modeling circuits in a reduction operation.

The reducing/broadcasting computation operations are typically performed using communication patterns in the shape of trees. FIG. 3A illustrates an example of a reducing/broadcasting communication tree 300 for reconfigurable hardware modeling circuits 310-328 in the reduction operation. The reconfigurable hardware modeling circuits 310-328 are divided into 8 pairs (e.g., circuits 310 and 320 being one of them). Communication channels between them (330, 340, 350 and 360) are indicated by arrows showing the directions for the reduction operation. One reconfigurable hardware modeling circuit (e.g., circuit 310) in each of the pairs sends its status signal the other (e.g., circuit 320) through communication channels 330. The status signals are then reduced into one status signal in the recipient for each pair. The same operation is repeated again for the next 4 pairs of the reconfigurable hardware modeling circuits, circuits 320-322, 324-323, 325-326, and 328-327, through communication channels 340 to produce further-reduced status signals. This approach is applied in two more steps through communication channels 350 and 360, respectively. In the end, circuit 327 computes a global status signal.

Figure 3B:
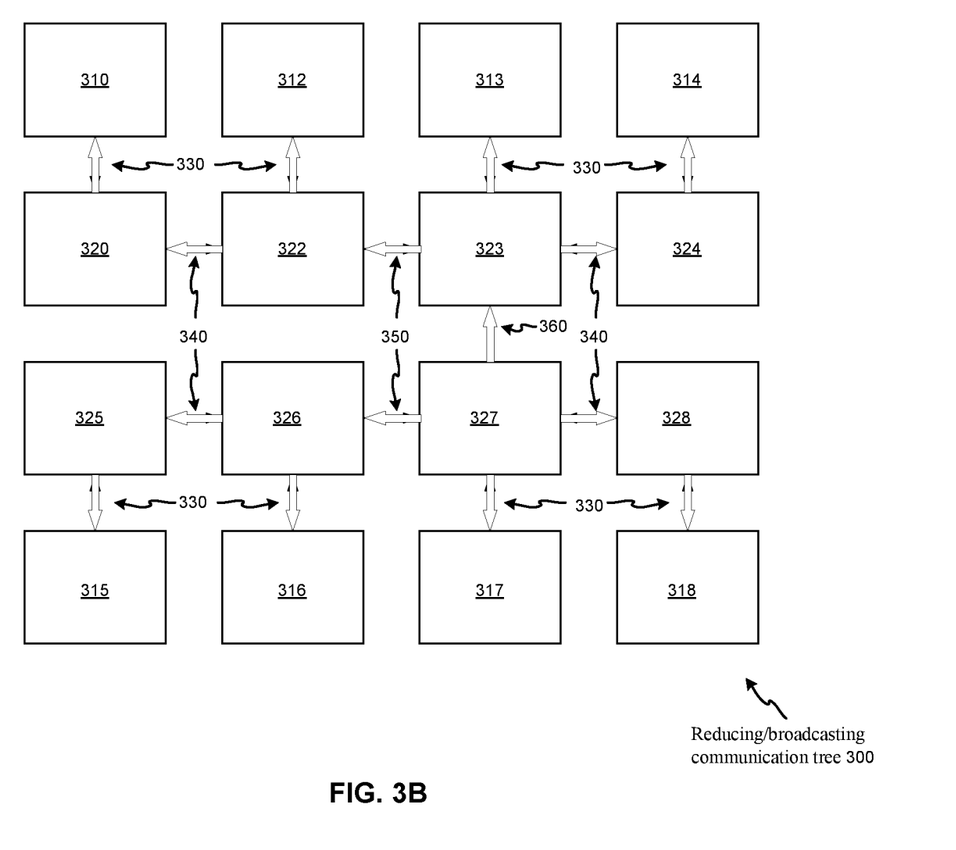
FIG. 3B illustrates an example of a reducing/broadcasting communication tree for reconfigurable hardware modeling circuits in a broadcast operation.

If N reconfigurable hardware modeling circuits that contain testbench elements are divided into N/2 pairs and the communication tree is binary like the one shown in FIG. 3A, the number of recursive reduction steps to generate a global status signal is $\log_2 N$. It typically takes $\log_2 N$ steps to broadcast the global status signal to all circuits which need it. This operation can also follow a tree pattern of communication. FIG. 3B illustrates an example of a reducing/broadcasting communication tree 300 for the reconfigurable hardware modeling circuits shown in FIG. 3A in the broadcast operation. Here, the communication channels 330, 340, 350 and 360 are used in reverse directions and in a reverse order for the broadcast operation compared to the reduction operation. The total number of the reducing and broadcasting steps is thus $2 \log_2 N$.

The reducing/broadcasting operations can be performed with communication trees of different cardinality. For example, N reconfigurable hardware modeling circuits that contain testbench elements are divided into N/4, N/16, N/64 . . . groups for consecutive reduction steps. In each of the reduction steps, status signals from 4 reconfigurable hardware modeling circuits are combined to generate one reduced status signal. The number of recursive reduction steps to generate a global status signal is $\log_4 N$. In another example, status signals from 8 reconfigurable hardware modeling circuits are combined to generate one reduced status signal in each reduction step. The number of recursive reduction steps to generate a global status signal is $\log_8 N$. In general, the number of recursive reduction steps to generate a global status signal for a communication tree with cardinality being m is $\log_m N$.

Selection of best cardinality for trees for reducing and broadcasting operations can involve multiple parameters. Theoretically, the higher the cardinality, the lower the tree depth, and the better the performance. However, high cardinality requires a large number of inputs and outputs on devices involved which may be achievable only to a certain degree. There may also be limitations on the rate at which data can enter/exit a device. Once the time to move all data in/out of a device for a particular tree level has reached the latency to send data elsewhere there is little or no further benefit from higher cardinality.

Figure 3C:
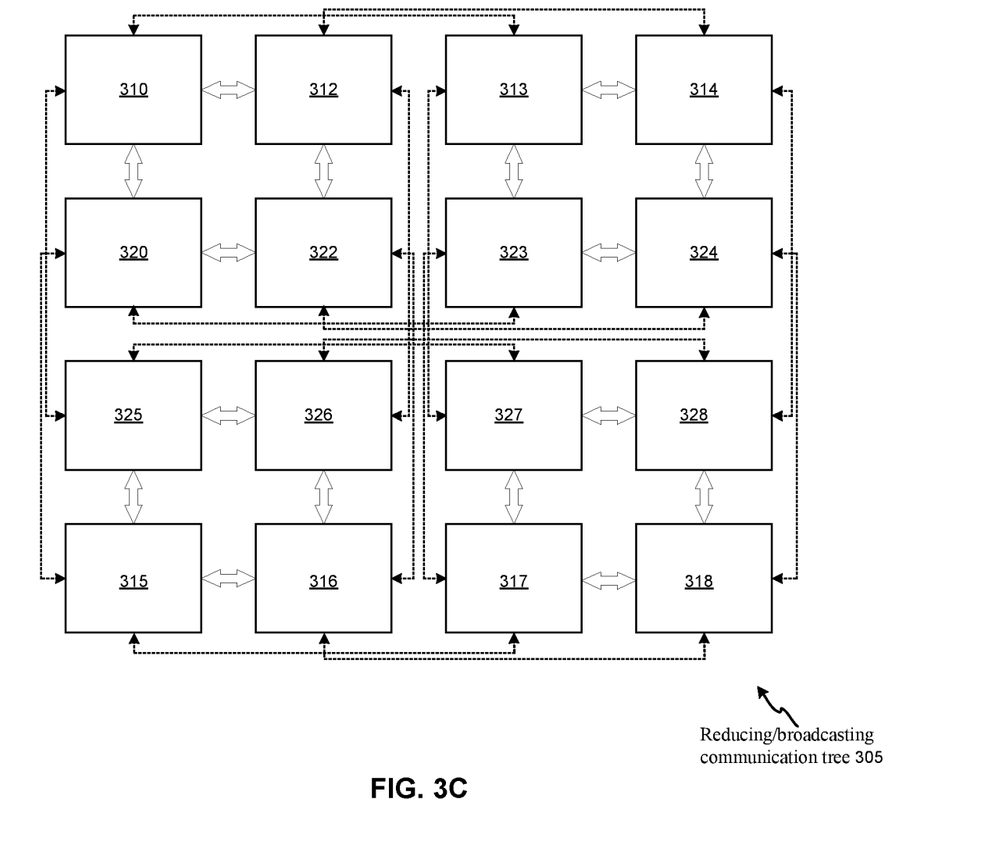
FIG. 3C illustrates an example of a reducing/broadcasting communication tree for reconfigurable hardware modeling circuits in a concurrent reduction and broadcast operation.

In an approach different from the one shown in FIGS. 3A and 3B, reduction and broadcast operations are structured in such a way that they are performed concurrently. FIG. 3C illustrates such an example. Rather than sending the status signal from one reconfigurable hardware modeling circuit in each of the pairs to the other through one of the communication channels 330 as shown in FIG. 3A, both of the reconfigurable hardware modeling circuits in each of the pairs send the status signals to each other and perform the reduction computation in each of the pairs. After this stage, each of the reconfigurable hardware modeling circuits has a reduced status signal for two vertical neighboring circuits (e.g., the reconfigurable hardware modeling circuits 310 and 320). That is, there are two copies of the N/2 reduced status signals in each of circuit pairs after the first stage of computation.

In the next stage, each of the reconfigurable hardware modeling circuits exchanges its reduced status signal with its horizontal neighbor (e.g., exchanging between the reconfigurable hardware modeling circuits 310 and 312) and computes a further reduced status signal. After this stage, each of the reconfigurable hardware modeling circuits has a further reduced status signal for four neighboring circuits (e.g., the reconfigurable hardware modeling circuits 310, 312, 320 and 322). That is, there are four copies of the N/4 reduced status signals in each of four neighboring circuits after the second stage of computation.

In the third stage, each of the reconfigurable hardware modeling circuits exchanges its further reduced status signal with its vertical neighbor two circuits away (e.g., exchanging further reduced status signals between the reconfigurable hardware modeling circuits 310 and 325) as indicated by the vertical dotted arrow lines in FIG. 3C and computes a still further reduced status signal. After this stage, each of the reconfigurable hardware modeling circuits has a still further reduced status signal for eight neighboring circuits (e.g., the reconfigurable hardware modeling circuits 310, 312, 320, 322, 325, 326, 315 and 316). That is, there are eight copies of the N/8 reduced status signals after the third stage of computation.

In the final stage, each of the reconfigurable hardware modeling circuits exchanges its further reduced status signal with its horizontal neighbor two circuits away (e.g., exchanging between the reconfigurable hardware modeling circuits 310 and 313) as indicated by the horizontal dotted arrow lines in FIG. 3C and computes a global status signal for all of the circuits in FIG. 3C. After this stage, each of the reconfigurable hardware modeling circuits has a global status signal. If there are more reconfigurable hardware modeling circuits, however, the process can be repeated similarly. After a total $\log_2 N$ times, each of the N reconfigurable hardware modeling circuits will have a copy of the global status signal and no separate broadcast operation is needed. This shows that the reducing/broadcasting processes can be completed in one traversal of a tree-structured communication pattern.

The communication tree for the above concurrent reduction and broadcast approach shown in FIG. 3C has only $\log_2 N$ depth in comparison to $2 \log_2 N$ for that of the same cardinality 2 involving separate reduction and broadcast steps shown in FIGS. 3A and 3B. However, this approach involves more data transmission because at each stage every device participates in the operation and thus there are N data sent per stage. Therefore, $N \log_2 N$ data are exchanged for the overall computation in comparison to 2N for the separate reduction and broadcast steps.

The concurrent reduction and broadcast approach is applicable when the contributors and destinations are the same. If the contributors and destinations are incomplete and not the same, the approach can be applied on the union of contributors and destinations with any destination which is not a contributor by sending a dummy value. For example, send a 1 as a dummy value in an AND reduction.

Networks for connecting reconfigurable hardware modeling circuits can be either direct or indirect networks. A direct network involves direct connections between subsets of reconfigurable hardware modeling circuits and purely direct networks mean that all network nodes are reconfigurable hardware modeling circuits. The network shown in FIGS. 3A-3C is a direct network. Here, the root node is the reconfigurable hardware modeling circuit 327; the branch nodes at the first level are the reconfigurable hardware modeling circuits 323 and 327; the branch nodes at the second level are the reconfigurable hardware modeling circuits 322, 323, 326, and 327; the branch nodes at the third level are the eight reconfigurable hardware modeling circuits 320-328; and the leaf nodes are the sixteen reconfigurable hardware modeling circuits 310-328.

Figure 4:
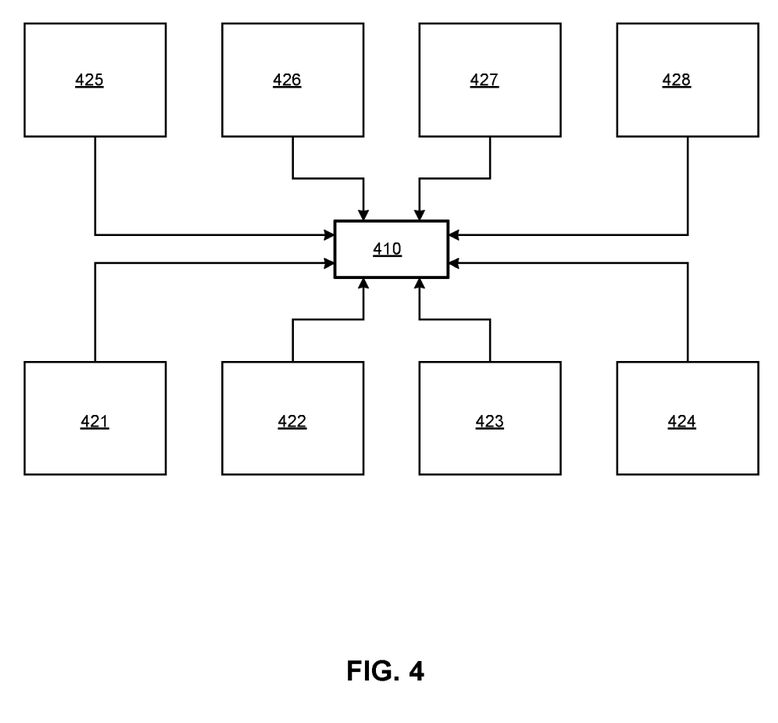
FIG. 4 illustrates an example of a node in an indirect communication network of reconfigurable hardware modeling circuits wherein the node is a network circuit.

An indirect network, in contrast, involves the use of network node circuits which are not reconfigurable hardware modeling circuits. These network circuits often perform only switching, routing, or both functions. FIG. 4 illustrates an example of a node in an indirect communication network. In the figure, eight reconfigurable hardware modeling circuits 421-428 are connected not to each other but to a network circuit 410 serving as a node. Emulation devices often employ hybrid networks. In a hybrid network, there are some direct connections between reconfigurable hardware modeling circuits comprising computing circuitry, but there are also some pure network circuits which connect together clusters of directly connected reconfigurable hardware modeling circuits.

In one example of a hybrid network, reconfigurable hardware modeling circuits are directly connected to other reconfigurable hardware modeling circuits on the same printed circuit board, but are indirectly connected through network circuits when sending data between circuit boards. Similarly, the same system has collections of emulation boards within chassis which can be interconnected and connections between circuits on different chassis pass through network circuits within each chassis, a first network circuit to reach an outbound path from the first chassis and a second network circuit from an inbound path on the second chassis to the eventual circuit. This use of indirect network elements to connect boards or chassis is common to allow a limited amount of interconnect wiring in/out of boards or in/out of systems to be shared symmetrically by all the reconfigurable hardware modeling circuits in the system. Interconnect resources are typically time multiplexed and this sharing can allow data from and to multiple distinct circuits to be carried on the scarce interconnect resources.

A reconfigurable hardware modeling circuit typically contains a sub-system for performing network switching functions and a sub-system for model computations. The network switching function normally is responsible for communicating signal data with other circuits including other reconfigurable hardware modeling circuits such as delivering this signal data in or out of the reconfigurable hardware modeling circuit. The network subsystem may also be configured to transmit data from inputs to outputs to serve as a bridge between reconfigurable hardware modeling circuits which are not directly connected by a physical channel. The model computation sub-system is configured to perform logical functions on signal data comprising locally generated data, locally stored data, data arriving via the network subsystem from other devices, or any combination thereof, and to send some data to other devices via the network subsystem.

As discussed previously, the depth of the communication tree, or the number of recursive reduction steps to generate a global status signal, is $\log_m N$, where N represents the total number of reconfigurable hardware modeling circuits and m represents the number of reconfigurable hardware modeling circuits in each group (cardinality). The higher the cardinality, the lower the tree depth. It may thus be desirable to perform a high-cardinality reducing/broadcasting operation step within a reconfigurable hardware modeling circuit. Conventional architecture of a reconfigurable hardware modeling circuit, however, can make such an approach sub-optimal in two aspects. First, the reducing computation needs to be performed in the computation sub-system, and transmitting data between the model computation sub-system and the network subsystem incurs a time delay in each direction. This time delay is accrued for each reducing step in the communication tree, and thus can lead to a large accumulated delay, affecting the circuit model execution speed. Second, there is typically a constrained amount of total data which can cross in or out from the compute subsystem in a clock cycle. Reduce/broadcast operations performed using the computation sub-system can consume the limited input and output resources of the computation sub-system.

Figure 5:
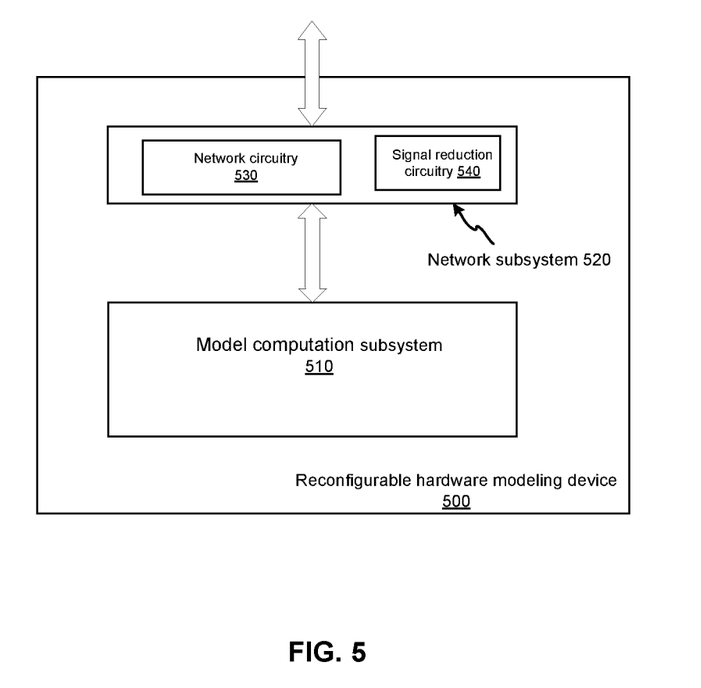
FIG. 5 illustrates an example of a reconfigurable hardware modeling circuit having signal reduction circuitry in the network subsystem according to various embodiments of the disclosed technology.

FIG. 5 illustrates an example of a reconfigurable hardware modeling circuit 500 according to various embodiments of the disclosed technology. The reconfigurable hardware modeling circuit 500 comprises a model computation subsystem 510 and a network subsystem 520. The network subsystem 520 comprises network circuitry 530 and signal reduction circuitry 540. The signal reduction circuitry 540 is configurable to perform a signal reduction function which combines a plurality of status signals into a single status signal. The plurality of signals comprise signals generated by other devices. The other devices can be one or more network switching circuits in the reconfigurable hardware modeling device, one or more reconfigurable hardware modeling circuits, or both. The plurality of status signals may further comprise a status signal generated by the model computation subsystem 510. The plurality of signals and the single status signal may be one-bit signals. In such cases, the signal reduction is sometimes referred to as scalar signal reduction.

Figure 6:
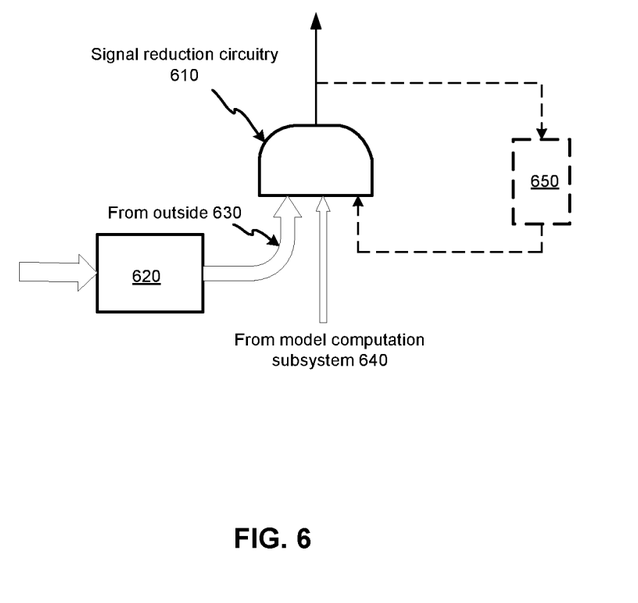
FIG. 6 illustrates an example of signal reduction circuitry and related circuitry in a network subsystem according to various embodiments of the disclosed technology.

FIG. 6 illustrates an example of signal reduction circuitry 610 and related circuitry in a network subsystem according to various embodiments of the disclosed technology. The signal reduction circuitry 610 is configured to perform a signal reduction function. The signal reduction function may be a scalar reduction function that combines single-bit input signals into a single-bit out signal. A logical AND function and a logical OR function are examples of such a scalar reduction function. The input signals for the signal reduction circuitry 610 comprise a status signal 640 from a model computation subsystem in the reconfigurable hardware modeling circuit where the signal reduction circuitry 610 is located and status signals 630 from outside of the reconfigurable hardware modeling circuit. Selection circuitry 620 in the same network subsystem may be employed to select which signals received from outside devices should participate in the computation of the signal reduction circuitry 610. It should be noted that the signal reduction circuitry 610 may perform the operation only on status signals from outside devices in some cases.

The network subsystem that comprises the signal reduction circuitry 610 may further comprise storage circuitry 650. The storage circuitry 650 is configured to store the single status signal generated by the signal reduction circuitry 610. The stored signal serves as one of the input signals for the signal reduction circuitry 610 in the next clock cycle. The storage circuitry 650 can be implemented by, for example, a flip-flop. In a time multiplexed network, as is common for emulation systems, different data may arrive at a location at different times. As such, the storage circuitry 650 can accumulate the status signals. If some input data arrive at a first time to a partial reduction computation involving the available inputs can be performed at that time and the resulting value can be stored in the storage circuitry 650. If additional input data arrive at another time t1, a further reduction computation can be performed using the newly available input data plus the value from the storage circuitry 650, and the new output status signal is stored in the storage circuitry 650. At time t when final input data arrive, the computed value for these input data plus the value from the storage circuitry 650 produces a final status value corresponding to the reduction value for all inputs across all time points at which they have arrived.

According to various embodiments of the disclosed technology, signal reduction circuitry is added into the network sub-system in a reconfigurable hardware modeling circuit. For a scalar reduction operation, the signal reduction circuitry can perform a simple logic function such as AND. This limited addition removes the need to move data between the network sub-system and the model computation system and thus can eliminate the time cost associated with it. Moreover, the reduction operation no longer consumes the limited input/output resources for the model computation subsystem. The cardinality of the reduction operation can thus no longer be constrained by the inputs/outputs of the model computation subsystem.

Emulation systems are often constructed with direct connect network topologies at some physical hierarchical levels, such as within printed circuit boards or small collections of printed circuit boards, and with indirect networks connecting the printed circuit boards or printed circuit board collections within or across chassis. The reason for this architectural characteristic is that the level of interconnect resources varies across physical boundaries of a system. Printed circuit boards can have many interconnect resources which are purely local to the board but fewer that cross the board boundary. Similarly, chassis containing multiple printed circuit boards can have a higher level of interconnect within, involving signals crossing between printed circuit boards, than cross the chassis boundary. Providing indirect network switching devices at boundaries between different physical hierarchy with differing levels of interconnect availability allows to share and optimally use limited high level interconnect resources while exploiting direct connect techniques at more interconnect rich lower levels. For such a hybrid network structure it is useful to employ devices with compute-augmented switching elements both for modeling devices within direct connected regions of the network, and for network devices in the indirect network.

Furthermore, large emulation systems are often assembled by composing together collections of smaller emulation systems connected by interconnect which interfaces through indirect network switch interface ports. Within such a composition of smaller systems to form a large system, performing a maximal amount of reduction/broadcast within indirect network devices at the sub-system boundaries can improve the system performance.

Similar to the network subsystem in a reconfigurable hardware modeling circuit, a network circuit in a reconfigurable hardware modeling device can comprise signal reduction circuitry configured to perform a signal reduction function which combines a plurality of status signals into a single status signal according to various embodiments of the disclosed technology. This removes the need to transmit the plurality of status signals to a reconfigurable hardware modeling circuit for the reduction computation and thus can speed up the operation of the reconfigurable hardware modeling device. Also similar to the network subsystem in a reconfigurable hardware modeling circuit, the signal reduction circuitry in a network circuit can comprise storage circuitry configured to store the single status signal generated by the signal reduction circuitry, allowing accumulative reduction computation.

In many applications, a user may want to configure a reconfigurable hardware modeling device in such a way that a reconfigurable hardware modeling circuit or a network circuit can serve as a node in more than one reducing/broadcasting communication networks for verifying a circuit design. Multiple users may also use one reconfigurable hardware modeling device to verify multiple circuit designs concurrently. In this situation, a network circuit in the reconfigurable hardware modeling device may need to be configured to serve as a node in multiple reducing/broadcasting communication networks in different verification processes. With various implementations of the disclosed technology, signal reduction circuitry in a network circuit or in the network subsystem in a reconfigurable hardware modeling circuit can be configured to perform multiple signal reduction computations simultaneously. For example, the signal reduction circuitry 610 can comprise a plurality of AND gates, of which each performs a signal reduction function for a node in a particular reducing/broadcasting communication network.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A reconfigurable hardware modeling device comprising:
   a plurality of reconfigurable hardware modeling circuits, each reconfigurable hardware modeling circuit of the plurality of reconfigurable hardware modeling circuits comprising:
      a model computation subsystem configurable either to model elements of a circuit design, or to serve as a testbench element, or both, and
      a network subsystem comprising: network circuitry and signal reduction circuitry, the network circuitry comprising circuitry configurable to perform a signal broadcast function, the signal reduction circuitry configurable to perform a signal reduction function, the signal reduction function being a function of combining a plurality of status signals into a single status signal, the plurality of status signals comprising status signals received from one or more reconfigurable hardware modeling circuits in the plurality of reconfigurable hardware modeling circuits, the signal broadcast function being a function of transmitting the single status signal to one or more other circuits in the reconfigurable hardware modeling device.

2. The reconfigurable hardware modeling device recited in claim 1, further comprising:
   a plurality of network circuits configurable to assist communications between the plurality of reconfigurable hardware modeling circuits, each network circuit of the plurality of network circuits comprising: another network circuitry and another signal reduction circuitry, the another signal reduction circuitry configurable to combine another plurality of status signals comprising status signals received from one or more reconfigurable hardware modeling circuits in the plurality of reconfigurable hardware modeling circuits into another single status signal, the another network circuitry comprising circuitry configurable to transmit the another single status signal to one or more other circuits in the reconfigurable hardware modeling device.

3. The reconfigurable hardware modeling device recited in claim 2, wherein the each network circuit of the plurality of network circuits further comprises storage circuitry configured to store an output of the another signal reduction circuitry, and the another plurality of status signals further comprise a signal outputted from the storage circuitry.

4. The reconfigurable hardware modeling device recited in claim 2, wherein the another signal reduction circuitry performs a logical AND function or a logical OR function.

5. The reconfigurable hardware modeling device recited in claim 1, wherein the network subsystem further comprises storage circuitry configured to store the single status signal, and the plurality of status signals further comprise a signal outputted from the storage circuitry.

6. The reconfigurable hardware modeling device recited in claim 1, wherein the plurality of status signals and the single status signal are one-bit signals.

7. The reconfigurable hardware modeling device recited in claim 1, wherein the signal reduction function is a logical AND function or a logical OR function.

8. The reconfigurable hardware modeling device recited in claim 1, wherein the plurality of status signals further comprise either a status signal generated by the model computation subsystem, or status signals received from one or more network switching circuits in the reconfigurable hardware modeling device, or both.

9. The reconfigurable hardware modeling device recited in claim 1, wherein the one or more other circuits in the reconfigurable hardware modeling device comprise either reconfigurable hardware modeling circuits in the plurality of reconfigurable hardware modeling circuits, or network circuits, or both.

10. The reconfigurable hardware modeling device recited in claim 1, wherein the reconfigurable hardware modeling device is a processor-based emulator, and the plurality of reconfigurable hardware modeling circuits are Boolean processor circuits.

11. The reconfigurable hardware modeling device recited in claim 1, wherein the reconfigurable hardware modeling device is an FPGA-based emulator, and the plurality of reconfigurable hardware modeling circuits are commercial FPGA chips or custom-designed FPGA chips.

12. The reconfigurable hardware modeling device recited in claim 1, wherein the signal reduction circuitry is configurable to compute reduced status signals for multiple reducing/broadcasting networks.

13. A reconfigurable hardware modeling device comprising:
   a plurality of reconfigurable hardware modeling circuits; and
   a plurality of network circuits configurable to assist communications between the plurality of reconfigurable hardware modeling circuits, each network circuit of the plurality of network circuits comprising: network circuitry and signal reduction circuitry, the network circuitry comprising circuitry configurable to perform a signal broadcast function, the signal reduction circuitry configurable to perform a signal reduction function, the signal reduction function being a function of combining a plurality of status signals into a single status signal, the plurality of status signals comprising status signals received from one or more reconfigurable hardware modeling circuits in the plurality of reconfigurable hardware modeling circuits, the signal broadcast function being a function of transmitting the single status signal to one or more other circuits in the reconfigurable hardware modeling device.

14. The reconfigurable hardware modeling device recited in claim 13, wherein each reconfigurable hardware modeling circuit of the plurality of reconfigurable hardware modeling circuits comprises:
   a model computation subsystem configurable either to model elements of a circuit design, or to serve as a testbench element, or both, and
   a network subsystem comprising: another network circuitry and another signal reduction circuitry, the another signal reduction circuitry configurable to combine another plurality of status signals comprising status signals received from one or more reconfigurable hardware modeling circuits in the plurality of reconfigurable hardware modeling circuits into another single status signal, the another network circuitry comprising circuitry configurable to transmit the another single status signal to one or more other circuits in the reconfigurable hardware modeling device.

15. The reconfigurable hardware modeling device recited in claim 14, wherein the network subsystem further comprises storage circuitry configured to store the another single status signal, and the another plurality of status signals further comprise a signal output from the storage circuitry.

16. The reconfigurable hardware modeling device recited in claim 14, wherein the another signal reduction circuitry performs a logical AND function or a logical OR function.

17. The reconfigurable hardware modeling device recited in claim 14, wherein the another plurality of status signals further comprise a status signal generated by the model computation subsystem.

18. The reconfigurable hardware modeling device recited in claim 13, wherein each network circuit of the plurality of network circuits further comprises storage circuitry configured to store the single status signal, and the plurality of status signals further comprise a signal outputted from the storage circuitry.

19. The reconfigurable hardware modeling device recited in claim 13, wherein the plurality of status signals and the single status signal are one-bit signals.

20. The reconfigurable hardware modeling device recited in claim 13, wherein the signal reduction function is a logical AND function or a logical OR function.

21. The reconfigurable hardware modeling device recited in claim 13, wherein the one or more other circuits in the reconfigurable hardware modeling device comprise either reconfigurable hardware modeling circuits in the plurality of reconfigurable hardware modeling circuits, or network circuits in the plurality of network circuits, or both.

22. The reconfigurable hardware modeling device recited in claim 13, wherein the reconfigurable hardware modeling device is a processor-based emulator, and the plurality of reconfigurable hardware modeling circuits are Boolean processor circuits.

23. The reconfigurable hardware modeling device recited in claim 13, wherein the reconfigurable hardware modeling device is an FPGA-based emulator, and the plurality of reconfigurable hardware modeling circuits are commercial FPGA chips or custom-designed FPGA chips.

24. The reconfigurable hardware modeling device recited in claim 13, wherein the signal reduction circuitry is configurable to compute reduced status signals for multiple reducing/broadcasting networks.

* * * * *